Aug. 1, 1967     W. R. BRADFORD     3,334,345

PASSIVE RADAR TARGET AUGMENTOR

Filed June 2, 1965

WILLIAM R. BRADFORD
INVENTOR.

BY Lyon & Lyon
ATTORNEYS

United States Patent Office 3,334,345
Patented Aug. 1, 1967

3,334,345
PASSIVE RADAR TARGET AUGMENTOR
William R. Bradford, San Diego, Calif., assignor to Micronetics Inc., a corporation of Nevada
Filed June 2, 1965, Ser. No. 460,778
5 Claims. (Cl. 343—18)

The present invention relates generally to improvements in reflectors for electromagnetic waves and in particular to a passive augmentation device for incorporation in radar targets such as tow targets or drones.

Oftentimes a radar target is used to test operational performance of a detection radar for VT-fusing of a missile. Generally the radar reponse of the drone target alone is too weak and therefore the simulation is unacceptable. To obviate this situation, tow targets and drones are often used with radar augmentation devices installed which are intended to increase the radar return or echo signal over a broad cone of incident angles. In such cases, several augmentation devices are often installed in a single target, each intended to cover a particular (conical) sector of the target's scattering pattern. Bistatic radar operation over various angles is also frequently required.

A general object of the present invention is to provide an improved augmentation device of this character which operates efficiently over a broad cone of incident angles.

A specific object of the present invention is to provide an augmentation device of this character in which the dielectric material is homogeneous throughout its mass.

Another specific object of the present invention is to provide an augmentation device of this character which operates efficiently over a broad cone of incident angles, monostatically or over bistatic angles of several degrees.

Another specific object of the present invention is to provide an augmentor device of this character having a unique configuration capable of predicting performance accurately.

Another specific object of the present invention is to provide an augmentor device of this character which is essentially a solid figure of revolution fabricated from a uniform or homogeneous dielectric material having low loss at microwave frequencies.

Figure 1:
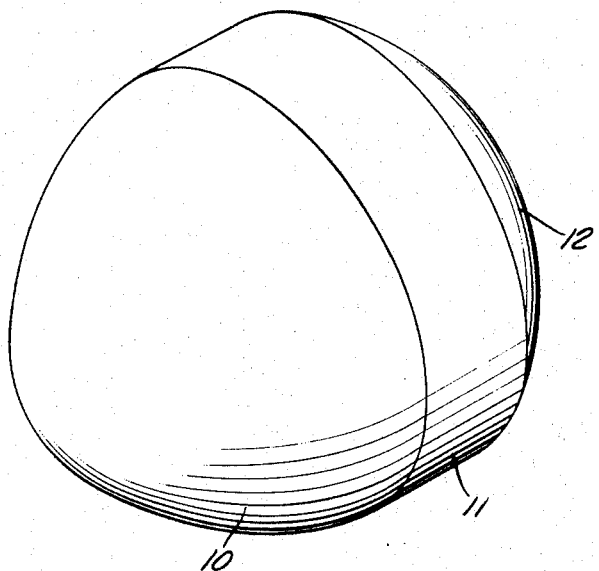

Other objects and advantages of the present invention will be apparent from the following description, reference being made to the accompanying drawings wherein:

FIGURE 1 is a perspective view illustrating a device incorporating features of the present invention.

Figure 2:
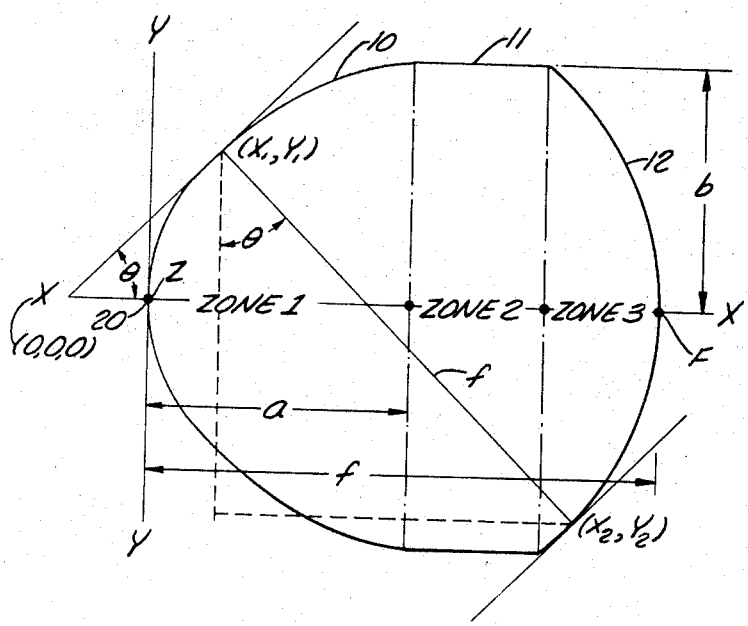

FIGURE 2 indicates the boundary of a transverse sectional view through the device of FIG. 1 and also illustrates certain geometrical relations which are useful in defining the shape of the device.

In the form of the device illustrated in FIGS. 1 and 2 there are three surfaces, namely, a front ellipsoidal surface 10, an intermediate cylindrical surface 11 and a back reflecting surface 12 of special configuration as defined later herein. In some forms of the invention, the intermediate cylindrical surface may be absent in which case there is a slope discontinuity at the junction of the surfaces 10 and 12, i.e., Zone No. 2 of FIG. 2 may be omitted in some forms of the invention in which case there is only a Zone 1 and a Zone 3.

Zone 1 in FIG. 2 is a portion of a prolate spheroid defined by the following equation:

$$\frac{(x-a)^2}{a^2} + \frac{y^2+z^2}{b^2} = 1 \qquad (1)$$

where all values of $x$ are less than $a$.

The above equation has reference with respect to the $x$—$x$ and $y$—$y$ coordinate system illustrated in FIG. 2 with the intersection of the $x$—$x$ and $y$—$y$ axes being at the point 20 which corresponds also to the centrally located tip of the prolate spheroid (Zone 1). A prolate spheroid is defined as an ellipsoid of revolution with an ellipse being rotated about its major axis which in this case is illustrated as being the $x$—$x$ axis.

It will be seen that the $y$—$y$ axis is displaced the distance $a$ in conformity with the equation above. The term $z$ has reference to the $z$ axis (the axis which is perpendicular to the plane of the drawing in FIG. 2). Having defined the half of the prolate spheroid in terms of the above equations, the particular shape of the reflecting surface 12 is defined or constructed in accordance with the following. First the magnitude of the quantity $f$ is chosen, this distance $f$ being the distance from the point 20, along the $x$—$x$ axis to the point F. The index of refraction of the dielectric material forming Zones 1, 2 and 3 has a finite value represented by the quantity $n$. Then the quantity $a$ which is one-half of the major axis of the prolate spheroid is defined as being equal to $$a \equiv \frac{nf}{n+1} \qquad (2)$$

and also the quantity $b$ is defined as being equal to the semi-minor axis, of the prolate spheroid, $$b \equiv a\sqrt{1-\frac{1}{n^2}} \qquad (3)$$

The dielectric constant of the material is of course equal to the square of the index of refraction and thus the index of refraction of the material may be established by measurement of its dielectric constant.

Typically $n$ and $b$ will be specified by the problem. Equation 2 *then* yields $a$ and *then* Equation 2 yields $f$.

It is noted that the quantity $n$ is initially defined as the index of refraction of the medium. 1 divided by $n$, as seen from Equation 3 above, is the eccentricity of the spheroid. Consequently the exact shape of the front surface is completely determined by the dielectric constant of the material used and a chosen over-all length $f$ of the desired device.

The shape of the surface 12 is derived from geometrical optics (ray tracing).

It will be noted that a plane wave initially propagating parallel to the $x$—$x$ axis (from left to right in FIG. 2) will be brought to an exact theoretical point of focus at the point $(x, y, z)$ which is equal in this case to $(f,0,0)$ because of the spheroidal boundary.

Considering the situation where the propagation direction of the incident plane wave is rotated in the plane of the paper through an angle, 90 degrees minus $\theta$, the plane wave no longer makes initial contact with the device at the origin 20 but rather at a point indicated as $x_1$, $y_1$ in FIG. 2. The ray which enters the dielectric at this first contact point does so without refraction since it travels along the surface normal. This ray continues to a point $(x_2, y_2)$ of FIG. 2 having gone a distance $f$ through the dielectric. This distance $f$ establishes the distance between points $x_1$, $y_1$ and $x_2$, $y_2$ and typically other points on the reflecting surface 12. The locus of such points $(x_2, y_2)$ is the profile of the back surface 12 and is established by the relations $$x_2 = x_1 + f \sin \theta$$

$$y_2 = y_1 - f \cos \theta$$

where $\theta$ may also be defined as the angle whose tangent is $$\frac{b^2(a-x_1)}{a^2 y_1}$$

While FIGS. 1 and 2 show three zones, Zones 1, 2 and 3 for purposes of discussion, actually the dielectric is not interrupted from one zone to the next, i.e., the same is homogeneous throughout and a reflecting coating is placed on the dielectric body to define surface 12. Zone 2 is illustrated as being a cylindrical region of radius $b$ which joins smoothly with the semi-spheroid whose semi-minor axis is also $b$. Zone 3 joins Zone 2 with a slope discontinuity at the junction. The location of this junction is determined by the shape of the back surface previously described.

This back surface 12 is made conducting by suitable means such as a snug fitting metallic cap which acts as a plane mirror to the "first contact" ray which enters without refraction. This ray meets the back surface at normal incidence and retraces its original path, emerging from the first contact point towards the source.

The over-all result of shaping the back surface as described above is that there is a gradual continuous transition from perfect focusing of all rays (axial incidence) to a compromise (off-axial incidence) in which the first contact ray, at least, is still directed back towards the source.

A device of this character when operated at for example 9.37 gigacycles per second may have a dimension of $b$ equal to 3.25 inches in which case the monostatic response is within 3 db of the specular flat plate response of the same diameter for angles of incidence within plus or minus 54° of the proloid axis which extends from point Z to point F.

In a typical construction the magnitude of the quantity $b$ may be 3¼ inches. The dielectric constant of the material may be 2.5. The quantity $a$ may be 4.2 inches and the quantity $f$ may be 6.85 inches. A device so made is particularly suitable for use as a reflector for radiation having a frequency of 9.37 gigacycles per second.

It will be seen from the foregoing that the reflecting surface 12 is the locus of all points lying the same equal distance, $f$, along lines which are normal to the prolate spheroid surface and extend within and through the prolate spheroid.

While there has been described what is at present considered the preferred embodiment of the invention, it will be understood that various changes and alterations may be made therein without departing from the essence of the invention and is intended to cover herein all such changes and alterations as come within the true scope and spirit of the annexed claims.

I claim:
1. A reflecting body of homogeneous dielectric material through which radiation passes after entering a front surface of said body, said front surface being defined by a portion of a prolate spheroid, said body having a rear reflecting surface thereon from which said entering radiation is reflected so as to return to said front surface and to leave said body through said front surface, said rear surface being the locus of all points lying the same equal distance along lines which are normal to said front surface and extend within and through said prolate spheroid portion.

2. A reflecting body as set forth in claim 1 in which the prolate spheroid is defined by the equation $$\frac{(x-a)^2}{a^2}+\frac{y^2+z^2}{b^2}=1$$

where $x$, $y$ and $z$ are coordinate points in three mutual perpendicular directions, $a$ is equal to $$\frac{nf}{n+1}$$

$b$ is equal to $$a\sqrt{1-\frac{1}{n^2}}$$

and where $n$ is the index of refraction of the dielectric material and $f$ is a constant.

3. A body as set forth in claim 1 in which said front face and rear reflecting surface are separated by a cylindrical portion of said body.

4. A reflecting body of homogeneous dielectric material through which radiation passes after entering a front surface of said body defined by a portion of a prolate spheroid, said body having a rear surface from which said entering radiation is reflected so as to return to said front surface and leave said body through said front surface, said rear surface being the locus of points spaced a constant distance from said front surface.

5. A body as set forth in claim 4 in which said front face and said rear surface are separated by a cylindrical portion of said body.

References Cited
UNITED STATES PATENTS

| | | | |
|---|---|---|---|
| 2,580,921 | 1/1952 | Iams | 250—33.65 |
| 2,849,713 | 8/1958 | Robinson | 343—911 |
| 2,866,971 | 12/1958 | Kelleher | 343—18 |
| 3,145,382 | 8/1964 | Cuming et al. | 343—18 |

RODNEY D. BENNETT, *Primary Examiner.*

CHESTER L. JUSTUS, *Examiner.*

G. M. FISHER, B. L. RIBANDO, *Assistant Examiners.*